Patented Nov. 19, 1929

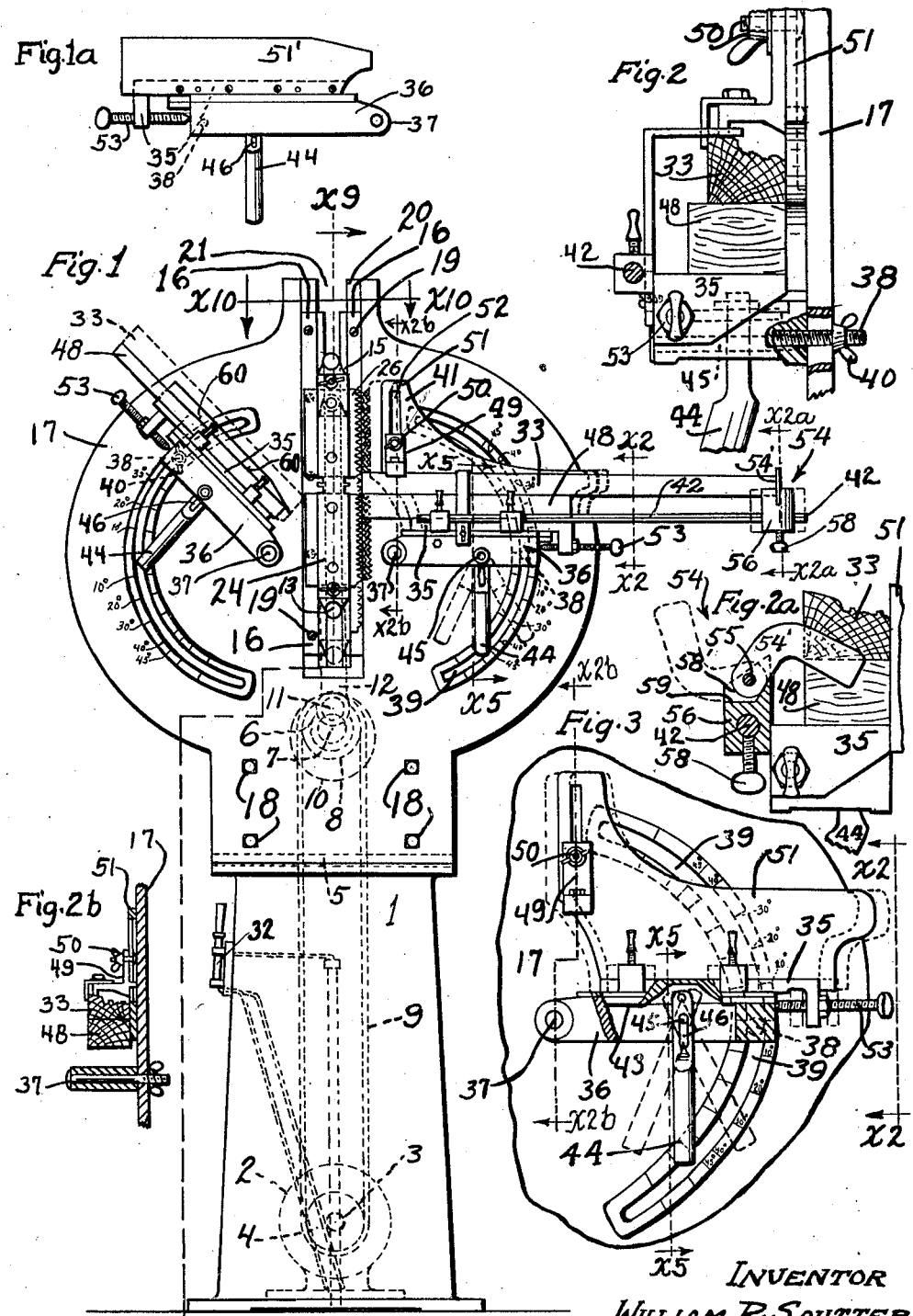

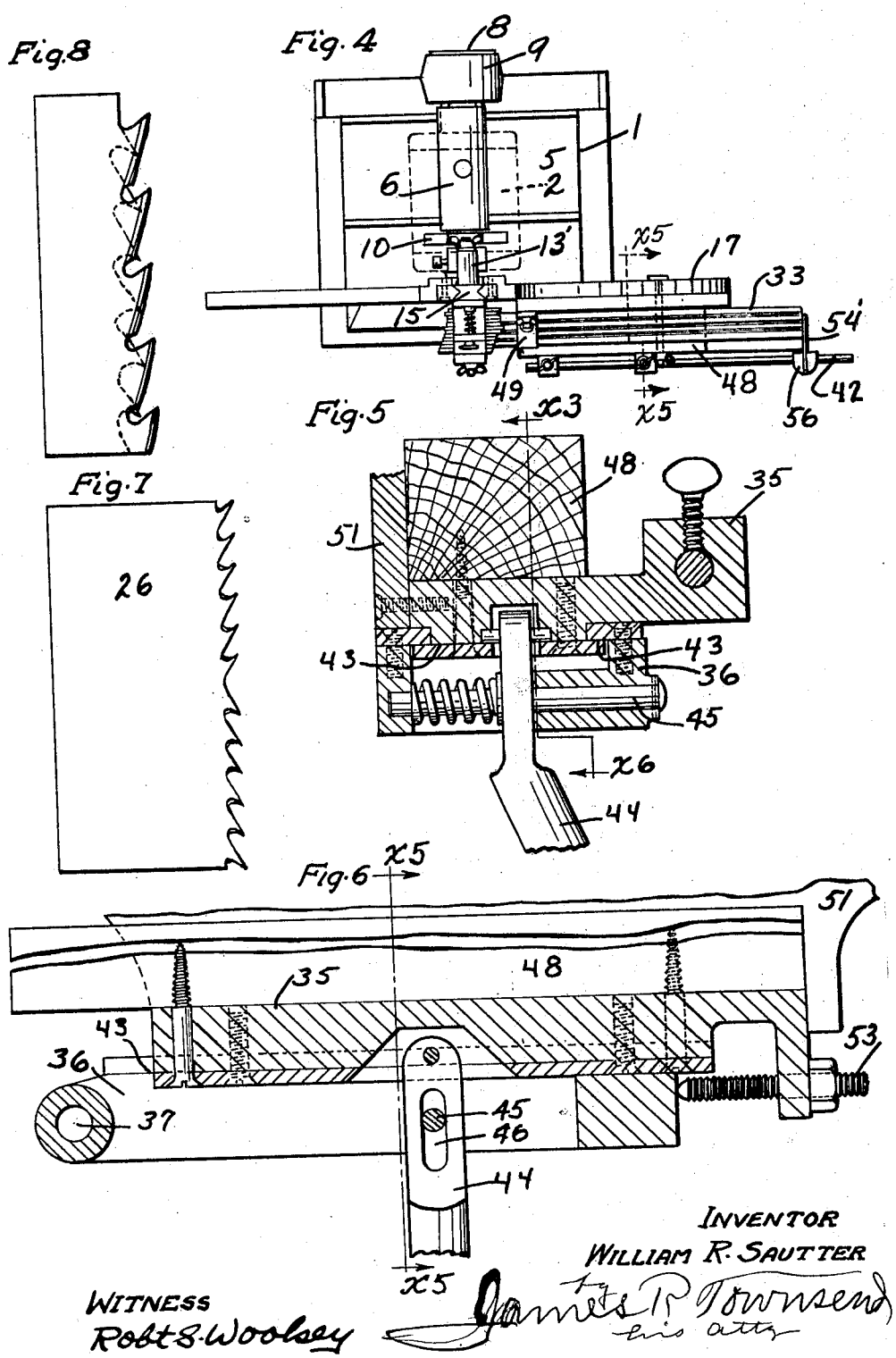

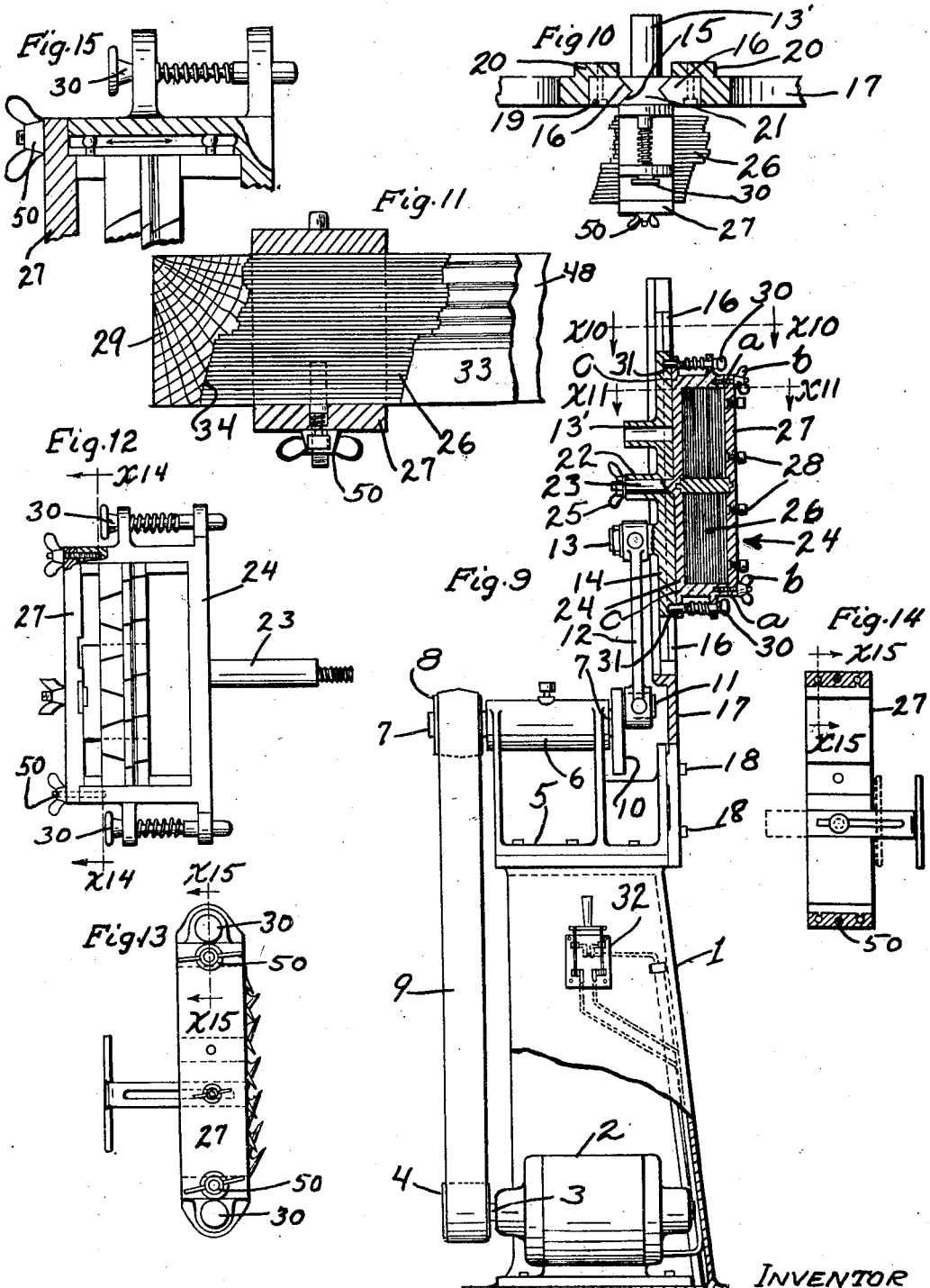

1,736,629

UNITED STATES PATENT OFFICE

WILLIAM R. SAUTTER, OF PHOENIX, ARIZONA, ASSIGNOR OF FORTY PER CENT TO NELSON CLYDE PIERCE, OF PHOENIX, ARIZONA

COPER FOR FORMING THE ENDS OF STRIPS AND STICKS

Application filed January 3, 1927. Serial No. 158,578.

This invention relates to means for forming joints between the meeting ends of strips of moldings for forming cornices or copings, and can also be used to form tenons on sticks or pieces for making furniture, and for other purposes.

The moldings referred to usually have one plane face adapted to fit against a wall and an outer ornamental face which is exposed to view; and such ornamental faces may be made up of surfaces either plane, or longitudinally fluted, ribbed, ridged, beaded or grooved, the longitudinal traces of which faces are parallel to the plane back surface of the molding, and are to be applied at an angle to the strip or molding to be fitted; and an object of this invention is to cross cut one end of a stick or molding strip so that such end will exactly conform to the outer or ornamental face of the strip to which it is to be joined to form the coping, cornice, or ornamental molding, so that when the molding strips or sticks are joined together at their ends, the union may be so exact, that it will not mar the appearance of the joint.

An object of this invention is to provide improved means for cutting the ends of a molding to fit other moldings at surfaces to form corner joints of copings and cornices.

Heretofore it has been customary to cut moldings for copings and cornice at a bevel at their meeting ends, with a view that when the joint is fitted, there will be no opening between the ends. Such cutting has to be done with great accuracy and a slight variation from the exact angle required, causes an opening at the joint, which spoils the finish; and such a method of forming the joint makes it necessary that both of the meeting ends of the molding or coping strips must be cut at an acute angle; and that the ends of such strips shall terminate in a sharp edge.

An object of this invention is to avoid such sharp terminations.

The cutters may be of any required number and are in the form of blades having saw teeth, the cutting edges of which are adapted respectively to cut across the grain of the molding or coping.

The invention also includes means for holding the molding strip with its end in position to be cross cut.

The invention may be embodied in a device the reciprocating frame of which is adapted for holding only one set of blades, or it may be constructed with a device adapted to hold two sets of blades and arranged to be turned on a pivot to bring first one of the sets in the position for action and then the other set in position for action.

Cheapness, simplicity, ease of assembly and of changing from set to set of cutters for fitting different forms of molding faces are other objects of the invention.

An object of the invention is to make provision whereby the molding can be quickly and easily brought into and clamped in position for cutting the joint forming surface, and can be easily released when the cutting has been effected.

The invention includes the various parts and combinations of parts going to make up the machine.

Strength, simplicity, low cost of machine, and economy of time in fitting the molding and coping, are further objects of the invention.

Other objects, advantages and features of invention may appear from the accompanying drawings, the subjoined detailed description and the appended claims.

The accompanying drawings illustrate the invention.

Figure 1 is a front elevation of a combined right and left hand shaper, constructed with two forms of work holders in accordance with this invention to cut at various angles; the right hand work holder holding a piece of molding in place for right angle shaping; and the left hand holder being in position to hold a piece of molding indicated in broken lines at an acute angle; two cutter tools are shown set for cutting right hand work.

Fig. 1$^a$ is a detached slightly enlarged rear view of a left hand work holder or chuck of the form shown at the left in Fig. 1.

Fig. 2 is a broken end elevational detail of the right hand work holder or chuck, partly in section and viewed from line $x^2$ in Figs. 1 and 3.

Fig. 2ª is a fragmental elevation from line $x^{2a}$, Fig. 1, showing in detail the molding gage closed in solid lines, and open in broken lines.

Fig. 2ᵇ is a vertical section on line $x^{2b}$, Figs. 1 and 3.

Fig. 3 is an enlarged broken front elevational detail of the right hand work holder or chuck in place, omitting the molding gage rod and showing parts in section substantially on line $x^3$—$x^6$, Fig. 5.

Fig. 4 is a plan of the machine shown in Fig. 1, omitting the left hand work holder.

Fig. 5 is a section on line $x^5$, Figs. 1, 3 and 6.

Fig. 6 is a longitudinal section on line $x^3$—$x^6$, Fig. 5.

Fig. 7 is a view of two juxtaposed thin toothed-blades or cutters to indicate the relatively reversed teeth on adjacent blades in the cutter tool shown in Figs. 1, 9, 10 and 11.

Fig. 8 is a view analogous to Fig. 7, showing blades of a thicker form for grooving a stick, stile or rail to receive a tenon.

Fig. 9 is an elevation from the left of Fig. 1, partly in section in a vertical plane indicated by line $x^9$, in Fig. 1.

Fig. 10 is a somewhat enlarged plan detail in section on line $x^{10}$, Figs. 1 and 9.

Fig. 11 is a further enlargement showing in section, the cutter frame on a plane indicated by $x^{11}$, Fig. 9, and showing in plan, the upper ends of a bunch of thin saw toothed blades in a position imposed upon them by applying to the back of the bunch of cutter blades, the ornamental face of a form or pattern made of a piece of molding to be fitted, and then tapping the toothed edges of the blades to cause them to contact with the oval face of the pattern, so that the toothed edges of the saw blades will form a cutting edge or face complementary to the ornamental face of the molding so as to correspondingly cross-cut the end of a molding to make it fit the ornamental face of a corresponding piece of molding; that is, to make its end conform to the pattern; a fragment of the end of a piece of molding is shown with a fluted ornamental side up; and it is understood that the end of said molding is conformed by the cutter, to the ornamental side of the molding it is to fit, and then when the two moldings are placed together, fluted end against fluted side, the longitudinal flutes and grooves of each will be continuations, at a predetermined angle, of the flutes and grooves of the other.

Fig. 12 is a side elevation of a form of shaper head with thick cutter blades, the toothed edges of which are shown.

Fig. 13 is an elevation from the left of Fig. 12.

Fig. 14 is a section on line $x^{14}$, Fig. 12.

Fig. 15 is a fragmental vertical section on lines $x^{15}$, Figs. 13 and 14.

The frame comprises a pedestal 1 which may be of any suitable form of construction, and is shown as a rectangular hollow column inside which is mounted a motor 2, the shaft 3 of which extends rearwardly from and outside the column, and is there provided with a driving pulley 4.

5 is a base flanged to the top of the column 1 and provided with a bearing 6 in which is journalled a crank shaft 7 provided at one end with a driven pulley 8 to which the driving pulley 4 is connected by a belt 9.

10 is a crank disk on the end of the crank shaft 7 opposite the driven pulley 8, and provided with a crank pin 11 which operates the connecting rod 12 journalled on a wrist pin 13 that projects from a reciprocating cutter frame carrier 14 having slides 15 that operate in ways 16 mounted on a support 17 fixed to the base 4 by cap screws 18. In Fig. 9 the carrier is shown provided with two wrist pins which may be either hollow or solid.

The ways 16 are detachably fixed by suitable means as the cap screws 19, to flanges 20 that are spaced apart to provide an open slot 21 through which the wrist pins 13, 13' extend to connect respectively with the cutter frame carrier 14, which in Fig. 9 is provided as shown with a hollow hub 22 that extends through the slot 21 and seats a shank 23 that is integral with the back 24 of the cutter frame 24' and projects therefrom through the hub 22 and is held in place by a wing nut 25.

The cutter frame comprises the back 24 and top and bottom ends $c$ and open front and sides.

Said shank 23 is fixed to and projects from the cutter frame back 24, that is integral with the top and bottom ends $c$ of said frame.

In Fig. 9 the blade holder is shown as completely filled between its ends with a partition and two bunches of toothed blades 26 that are clamped in place by the front piece 27 of the frame that is held in place by stud bolts $a$ which are screwed into the ends $v$ of the cutter frame to secure the front piece 27 which is held on the end walls $c$, by wing nuts $b$, and is provided with spring pressers 28 to yieldingly hold the toothed blades in the frame in moderate frictional relation to each other so that when the pattern or form 29 is in place behind the toothed blades, and such blades are pressed toward the form, said blades may be adjusted edgewise to fit the pattern, and the nuts $b$ tightened.

The cutter frame in Fig. 9 is shown revolvable on the shank 23 and said frame is provided at its ends with locking bolts 30 that seat in sockets 31 in the cutter frame carrier 14.

When the parts are in an operative position as described, and shown in the several views, the motor is started by operating the switch 32 and thereby the tool comprising the bunch of cutters is vertically reciprocated at a high speed so that the toothed edges of the blades will cut the end of the molding strip 33 to conform to the face 34 of the pattern or form 29 to which the saw tooth blades 26 have been adjusted as shown in Fig. 11.

The work holder is illustrated in Figs. 1, 2 and 3 as comprising a shiftable table 35 slidably mounted on an angularly adjustable bolster 36 that is pivoted on a pin 37 which is adjustably fixed by a bolt 38 extending through an arcuate slot 39 in the support 17 and clamped in any predetermined position by a clamp nut 40. The pin 37 is central to the slot 39 so that the bolster 36 may be swung to any desired angle relative to the saw teeth.

In the form shown in Fig. 1 such angle is limited by the work clamping frame 41 which is fixed to the adjustable table 35 carrying an adjustable gage rod 42, and that is mounted in ways 43 in the bolster 36 that is adjustable along such ways by an adjusting lever 44 that is pivoted by a pivot 45 to the table and is connected by lost motion means as the pivoting pin 45 and slot 46, to the bolster; so that when the bolster is set in any desired position such as is shown in Fig. 1, as at right angles to the cutting edge of the bunch of saw teeth, the table will be held at right angles to the saw tooth edges, and by operating the lever, the table will be moved toward and from the saw teeth at right angles thereto. By changing the angle of the bolster, the angle of the cut will be changed so that the moldings can be joined at an angle other than a right angle, when required.

48 represents a wooden support for the molding 33 the end of which is to be shaped; and 49 is an adjustable clamp fixed by bolt and wing nut 50 to an upright 51 of the table that has a slot 52 along which the bolt 50 may be slid so that when the stick of molding 33 is laid on the support 48 and is clamped by the clamp 49, the stick may be moved toward and from the saw teeth so that when the cutter frame is being reciprocated up and down by the motor the end of the molding may be brought into position where its end will be instantly shaped.

53 is an adjustable stop consisting of a screw, screwed through a flange on the shiftable table and adapted to contact with the end of the bolster at such point as may be required to stop the molding when its end has been properly cross cut.

54 is a gage for use when numerous pieces of molding of the same length are to be shaped. A stop is shown in the form of a flat curved finger 54' pivoted at 55 to the adjustable gage block 56 slidably mounted on a rod 57 that extends in parallelism to the wooden support 48 and is adjustably fixed to such rod by a set screw 58. The heel 58' of the stop finger 54', and the floor 59 of the slot in which it is pivoted are constructed to stop the finger in its stop position shown in solid lines in Fig. 2ª, and in its open position shown in dotted lines in said Fig. 2ª, so that it may be flipped from one to the other position by a touch of the hand for stopping short moldings or freeing long moldings.

In cases where the chuck has an extended clamping frame as at 41 in Fig. 1, the range of angles to which the end of the work 33 may be cut is limited, but the chuck on the left hand in said Fig. 1 is shown without such extension 41 and is adjusted at an acute angle to hold the piece of work 33 there shown in dotted lines, in position to be cut obliquely by the cutter tool.

Anti-slip devices, as the points 60, on the work holder are provided to engage the work 33 and assist in holding it from slipping when the bolster is moved toward the cutter.

In operating with either the right or left hand chuck, the handle 44 will be moved to withdraw the bolster 35 from its advanced position and then the work, as the stick 33, will be placed in fixed position relative to the bolster, as by the clamp 49 or the point 60, and then the handle 44 will be moved to shift the bolster and the work thereon toward the cutting edges until the cut is completed, then the handle will be moved to shift the bolster and withdraw the stick from the path of the cutters, then the stick will be removed from the bolster and replaced with a new stick and so on.

With the arrangement shown in Fig. 1, all that is necessary to change from the right angle cut to the oblique angle cut is simply to unscrew the wing nut 25, withdraw the frame 24', turn it upside down, replace it, and then apply and tighten the nut 25 as before.

The wooden work support 48 is preferably of hard strong wood that can be cut by the cutters and thereby conformed at the end to the end desired for the molding and it projects beyond the bolster toward the cutters so that when a new setting of the cutters is made the end of the support may be cut by such cutters to conform to the end cut of the stick, thus preventing splitting or fuzzing of the stick by the teeth of the cutter.

I claim:—

1. In combination with a reciprocating cutter; a bolster angularly adjustable relative to the cutter; a work holder on the bolster; a gage rod fixed to the bolster; a gage block adjustable on the gage rod; means to fix the gage block on the gage rod; and a gage finger pivoted to the gage block and adapted to be moved into and out of the way of a stick on the work holder.

2. In a machine of the class described, the combination with a frame; of a cutter frame carrier reciprocally mounted on the frame; a plurality of relatively adjustable toothed blades in said carrier; a motor for reciprocating the carrier; a bolster pivotally supported on the frame; means for adjusting and setting the bolster at varying angles; a table shiftably supported by the bolster; an adjustable stop for the table; a wooden support for the work; a clamping frame for the work; and a lever for moving the table with the stop, support and clamping frame toward and away from the frame carrier during its reciprocation.

In testimony whereof, I have hereunto set my hand at Phoenix, Arizona, this 2 day of December, 1926.

WILLIAM R. SAUTTER.